United States Patent
Feuersaenger et al.

(10) Patent No.: US 9,258,080 B2
(45) Date of Patent: *Feb. 9, 2016

(54) COMMUNICATION TERMINAL AND METHOD FOR USE IN A COMMUNICATION TERMINAL

(71) Applicant: PANASONIC CORPORATION, Osaka (JP)

(72) Inventors: Martin Feuersaenger, Bremen (DE); Joachim Loehr, Wiesbaden (DE); Alexander Golitschek Edler Von Elbwart, Darmstadt (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,904

(22) Filed: Jun. 10, 2014

(65) Prior Publication Data

US 2014/0348045 A1    Nov. 27, 2014

Related U.S. Application Data

(63) Continuation of application No. 12/672,955, filed as application No. PCT/EP2008/004684 on Jun. 11, 2008, now Pat. No. 8,787,219.

(30) Foreign Application Priority Data

Aug. 16, 2007    (EP) ..................... 07016131

(51) Int. Cl.
*H04B 7/00* (2006.01)
*H04W 4/00* (2009.01)
(Continued)

(52) U.S. Cl.
CPC ............ *H04L 1/0026* (2013.01); *H04L 1/0027* (2013.01); *H04L 1/0028* (2013.01); *H04W 24/10* (2013.01)

(58) Field of Classification Search
CPC .... H04L 1/0026; H04L 1/0027; H04W 24/10
USPC .......................................... 370/310
See application file for complete search history.

(56) References Cited

U.S. PATENT DOCUMENTS 6,212,368 B1    4/2001  Ramesh
6,920,171 B2 *  7/2005  Souissi et al. ................. 375/133
(Continued)

FOREIGN PATENT DOCUMENTS

CN    1340984     3/2002
CN    1701621     11/2005
(Continued)

OTHER PUBLICATIONS

Japanese Notice of Reason for Rejection dated Jul. 23, 2013, with English translation.
(Continued)

*Primary Examiner* — Shripal Khajuria
*Assistant Examiner* — Farhad Ali
(74) *Attorney, Agent, or Firm* — Dickinson Wright PLLC (57) ABSTRACT

The present invention describes a method for configuring a measurement report type to be used by a receiver to report a measurement to a transmitter, wherein the measurement is reported to the transmitter in a report signal over a control channel. The method includes selecting a first measurement report type and at least one second measurement report type to be used by the receiver to report the measurement, generating a measurement reporting pattern defining an occurrence of the first measurement report type and the at least one second measurement report type in the report signal transmitted by the receiver to the transmitter over control channel, and notifying the first measurement report type, the at least one second measurement report type, and the generated measurement reporting pattern to the receiver.

8 Claims, 5 Drawing Sheets

(51) Int. Cl.
*H04L 1/00* (2006.01)
*H04W 24/10* (2009.01)

(56) References Cited

U.S. PATENT DOCUMENTS

| | | | |
|---|---|---|---|
| 8,064,897 | B2 | 11/2011 | Matsumoto |
| 2004/0110473 | A1 | 6/2004 | Rudolf |
| 2006/0072510 | A1 | 4/2006 | Aizawa |
| 2007/0149132 | A1 | 6/2007 | Li |
| 2007/0168326 | A1 | 7/2007 | Das |
| 2008/0259811 | A1* | 10/2008 | Cordeiro et al. ............ 370/252 |
| 2011/0141940 | A1 | 6/2011 | Kim |
| 2011/0299447 | A1 | 12/2011 | Rudolf |

FOREIGN PATENT DOCUMENTS

| | | |
|---|---|---|
| CN | 1863383 | 11/2006 |
| EP | 1 233 582 | 8/2002 |
| EP | 1 473 956 | 11/2004 |
| EP | 1 705 818 | 9/2006 |
| JP | 2005-57391 | 3/2005 |
| JP | 2005-244958 | 9/2005 |
| JP | 2006-509478 | 3/2006 |
| JP | 2007-189523 | 7/2007 |
| WO | 2007/031956 | 3/2007 |
| WO | 2007/050729 | 5/2007 |
| WO | 2007/076037 | 7/2007 |

OTHER PUBLICATIONS

Japanese Notice of Reason for Rejection dated Dec. 13, 2011, with English translation.
Japanese Notice of Reason for Reject on dated Mar. 6, 2012, with English translation.
Japanese Office Action dated Jun. 12, 2012, with English translation.
3GPP TSG RAN WG1 50, "Design Aspects of UE Feedback," Texas Instruments, R1-073423, Athens, Greece, Aug. 20-24, 2007, pp. 1-5.
3GPP TSG-RAN WG2 Meeting #59, "CQI Trigger Mechanism," Nokia, et al., R2-073055, R2-072584, Athens, Greece, Aug. 20-24, 2007, pp. 1-7.
International Search Report dated Jul. 23, 2008.
ETSI TS 125 331 V7.3.0 (Dec. 2006), Technical Specification, Universal Mobile Telecommunications System (UMTS); Radio Resource Control (RRC); Protocol specification, (3GPP TS 25.331 version 7.3M Release 7,) Dec. 2006, pp. 1-28 and 221-223.
3GPP TSG-RAN WG1 Meeting #46bis, "Evaluation and Error Statistics for CQI Reporting Schemes," Panasonic, R1-062808, Seoul, Korea, Oct. 9-13, 2006, pp. 1-11.
Chinese Office Action dated Sep. 21, 2015, with English translation.
English translation of Chinese Patent Application No. 1340984.

* cited by examiner

0: measurement report type 0
1: measurement report type 1
2: measurement report type 2

| 1 | 0 | 0 | 0 | 0 | 0 | 0 | 0 |

| 1 | 0 | 0 | 0 | 0 | 2 | 0 | 0 |

| Information Element/Group name | Type and reference | Semantics description |
|---|---|---|
| CQI reporting types | Integers | Selecting reporting types for the next reporting period |
| CQI reporting pattern | Bitmap or Integers | Giving the pattern of the CQI reports |
| CQI feedback cycle | Integer (0, 2, 4, 8, 10, 20, 40, 80, 160) | In milliseconds. |
| CQI repetition factor | Integer | Number of pattern repetition |

FIG. 8

| Information Element/Group name | Type and reference | Semantics description |
|---|---|---|
| CQI process ID | Integer | |
| CQI reporting type | Integer | Selecting reporting types for the next reporting period |
| CQI feedback cycle | Integer (0, 2, 4, 8, 10, 20, 40, 80, 160) | In milliseconds. |
| CQI repetition factor | Integer | Number of pattern repetition |

FIG. 9

COMMUNICATION TERMINAL AND METHOD FOR USE IN A COMMUNICATION TERMINAL

CROSS REFERENCE TO RELATED APPLICATION

This is a divisional application of application Ser. No. 12/672,955 filed Feb. 10, 2010, which is a 371 of PCT/EP2008/004684 filed Jun. 11, 2008, which is based on European Application No. EP 07016131-0 filed Aug. 16, 2007, the entire contents of each of which are incorporated by reference herein.

FIELD OF THE INVENTION

The present invention relates to indicating and identifying different versions of uplink measurement reports. Methods are presented to distinguish such reports so that the receiver can know which measurement report type has been sent. The invention is applicable in the field of communication between a transmitter and a receiver. It is particularly related to communication systems where a receiver sends feedback information to the transmitter, where the feedback contains different information about the communication channel condition experienced by the receiver and the transmitter needs to distinguish between several such reports of different content.

BACKGROUND OF THE INVENTION

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G. The 3GPP launched a Study Item "Evolved UTRA and UTRAN" (E-UTRA and E-UTRAN). The study will investigate means of achieving major leaps in performance in order to improve service provisioning and reduce user and operator costs.

It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned.

More specifically, some key performance and capability targets for the long-term evolution are:
  Significantly higher data rates compared to HSDPA and HSUPA: envisioned target peak data rates of more than 100 Mbps over the downlink and 50 Mbps over the uplink
  Improved coverage: high data rates with wide-area coverage
  Significantly reduced latency in the user plane in the interest of improving the performance of higher layer protocols (for example, TCP) as well as reducing the delay associated with control plane procedures (for instance, session setup)
  Greater system capacity: threefold capacity compared to current standards.

One other key requirement of the long-term evolution is to allow for a smooth migration to these technologies.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use.

The choice of adaptive multi-layer Orthogonal Frequency Division Multiplexing (AML-OFDM) in downlink will not only facilitate to operate at different bandwidths in general but also large bandwidths for high data rates in particular. Varying spectrum allocations, ranging from 1.25 MHz to 20 MHz, are supported by allocating corresponding numbers of AML-OFDM sub-carriers. Operation in both paired and unpaired spectrum is possible as both time-division and frequency-division duplex is supported by AML-OFDM.

OFDM with Orthogonal Frequency Domain Adaptation

The AML-OFDM-based downlink has a frequency structure based on a large number of individual sub-carriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency. In order to handle different delay spreads and corresponding cell sizes with a modest overhead, the OFDM cyclic prefix length can assume two different values. The shorter 4.7 ms cyclic prefix is enough to handle the delay spread for most unicast scenarios. With the longer cyclic prefix of 16.7 ms, very large cells, up to and exceeding 120 km cell radius, with large amounts of time dispersion can be handled. In this case, the length is extended by reducing the number of OFDM symbols in a sub-frame.

The basic principle of Orthogonal Frequency Division Multiplexing (OFDM) is to split the frequency band into a number of narrowband channels. Therefore. OFDM allows transmitting data on relatively flat parallel channels (sub-carriers) even if the channel of the whole frequency band is frequency selective due to a multipath environment. Since the sub-carriers experience different channel states, the capacities of the sub-carriers vary and permit a transmission on each sub-carrier with a distinct data-rate. Hence, sub-carrier wise (frequency domain) Link Adaptation (LA) by means of Adaptive Modulation and Coding (AMC) increases the radio efficiency by transmitting different data-rates over the sub-carriers. OFDMA allows multiple users to transmit simultaneously on the different sub-carriers per OFDM symbol. Since the probability that all users experience a deep fade in a particular sub-carrier is very low, it can be assured that sub-carriers are assigned to the users who see good channel gains on the corresponding sub-carriers.

Two different resource allocation methods can be distinguished upon when considering a radio access scheme that distributes available frequency spectrum among different users as in OFDMA. The first allocation mode or "localized mode" tries to benefit fully from frequency scheduling gain by allocating the sub-carriers on which a specific UE experiences the best radio channel conditions. Since this scheduling mode requires associated signalling (resource allocation signalling, measurement reporting in uplink), this mode would be best suited for non-real time, high data rate oriented services. In the localized resource allocation mode a user is allocated continuous blocks of sub-carriers.

The second resource allocation mode or "distributed mode" relies on the frequency diversity effect to achieve transmission robustness by allocating resources that are scattered over time and frequency grid. The fundamental difference with localized mode is that the resource allocation algorithm does not try to allocate the physical resources based on some knowledge on the reception quality at the receiver but select more or less randomly the resource it allocates to a particular UE. This distributed resource allocation method seems to be best suited for real-time services as less associated signalling (no fast measurement reporting, no fast allocation signalling) relative to "localized mode" is required.

Figure 1:
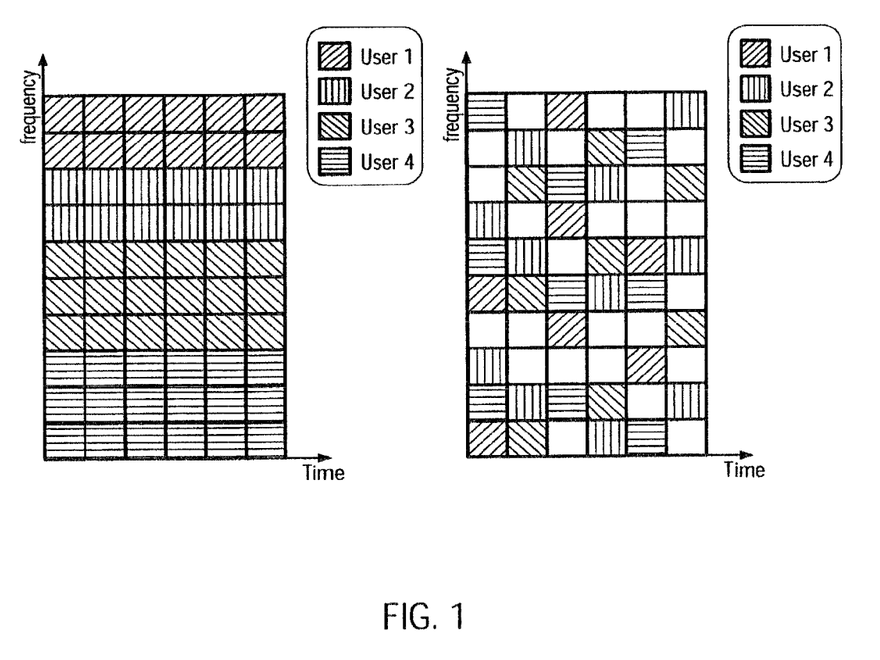
FIG. 1 Localized (left) and distributed (right) resource allocation of resource blocks for data transmission.

The two different resource allocation methods are shown in FIG. 1 for an OFDMA based radio access scheme. As can be seen from the left-hand part of FIG. 1, which depicts the localized transmission mode, the localized mode is characterized by the transmitted signal having a continuous spectrum that occupies a part of the total available spectrum. Different symbol rates (corresponding to different data rates) of the transmitted signal imply different bandwidths (time/frequency bins) of a localized signal. On the other hand, as can be seen from the right-hand part of the figure, distributed mode is characterized by the transmitted signal having a non-continuous spectrum that is distributed over more or less the entire system bandwidth (time/frequency bins).

Measurement Reporting

As a common example for uplink measurement reporting we will describe Channel Quality Reporting in this section. As already mentioned above, when allocating resources in the downlink to different users in a cell, the scheduler takes information on the channel status experienced by the users for the sub-carriers into account. Channel quality information (CQI), the control information signalled by the users, allows the scheduler to exploit the multi-user diversity, thereby increasing the spectral efficiency.

CQI is used in a multi-user communication system to report the quality of channel resource(s). Apart from aid in a multi-user scheduler algorithm in the MAC layer on the network side this information may be used to assign channel resources to different users, or to adapt link parameters such as employed modulation scheme, coding rate, or transmit power, so as to exploit the assigned channel resource to its fullest potential.

Figure 2:
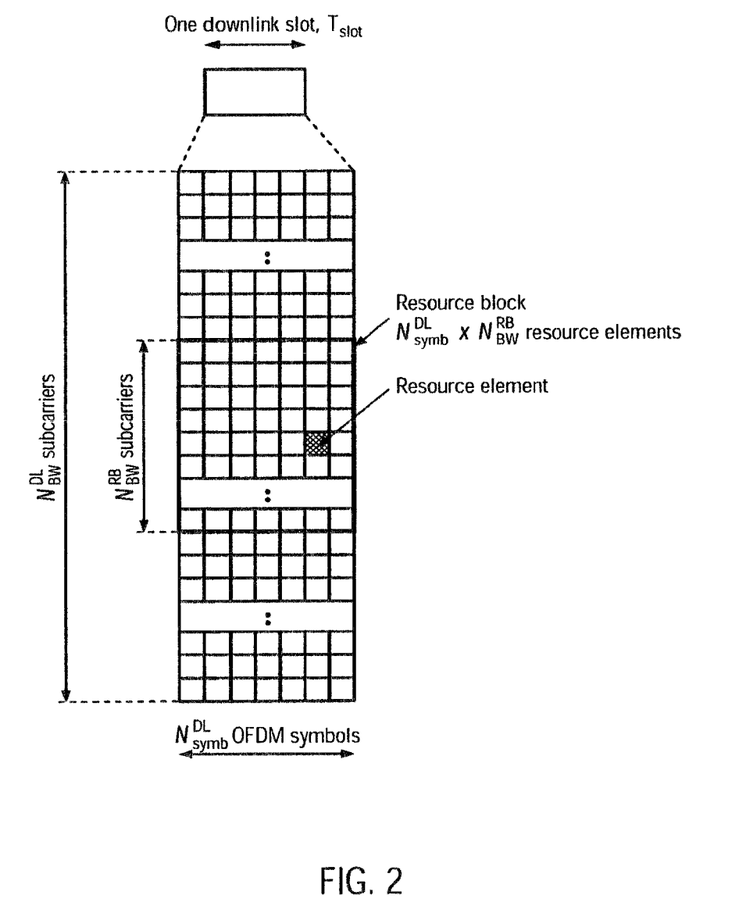
FIG. 2 Visualisation of used terms and symbols.
Figure 3:
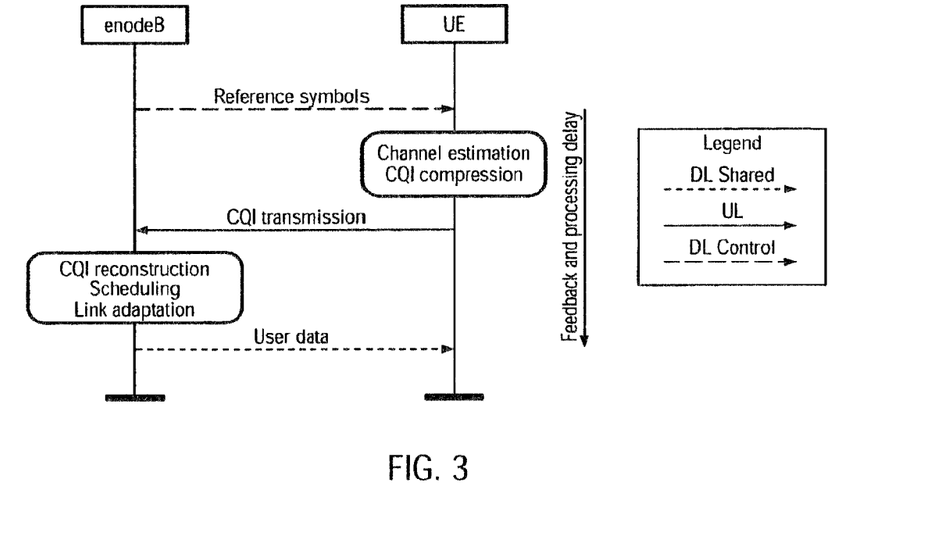
FIG. 3 Signal flow for measurement reporting between an eNodeB and a UE for the particular example of channel quality reporting.

A channel resource may be defined as a "resource block" as shown in FIG. 2 assuming a multi-carrier communication system, e.g. employing OFDM. In order to have information on the "quality" of this resource block, measurement of the channel quality have to be taken in the receiving side. An exemplary solution for this is to perform a measurement of the Signal-to-Noise-plus-Interference Ratio (SINR) using reference symbols provided by the transmitting side. However, quality reports are not limited to this and could also contain other types of measurement like a Block Error Rate (BLER) or even UE capabilities like decoder complexity or RF improvements. Examples of different CQI compression formats resulting in different CQI reporting types are given in the document "3GPP TSG-RAN WG1 Meeting #46 bis, TDoc R1-062808, 09-13 October 2006, Seoul, Korea". The signalling flow between the network (eNodeB) and the UE for CQI reporting is depicted in FIG. 3.

Assuming that the smallest unit can be assigned or adapted according to the above, in the ideal case CQI for all resource blocks for all users should be always available. However, due to constrained capacity of the feedback channel, this is most likely not feasible. The feedback channel resources available for CQI is limited and these resources have to be shared among all reporting UEs.

Therefore, reduction techniques are required, so as to transmit for example CQI information only for a subset of resource blocks for a given user. One possibility is to report only the strongest resource blocks. Furthermore, different transmission techniques as described in the section above related to OFDM require also different forms of CQI reports. As already described above, FIG. 1 depicts downlink transmissions in distributed and localized mode. Both transmission methods require different CQI reports. The localized mode needs a quality report exactly on the bandwidth fraction used for the transmission to the specific UE, whereas the distributed mode needs information on the whole bandwidth (which would probably be reduced to an average overall value of e.g. SINR due to the resource constraints as discussed above)

Depending on the variability of the channel conditions experienced, the network can decide to configure an UE with different periodicity for CQI reporting. In case of a slowly changing channel, a reduced reporting frequency saves uplink resources on the physical uplink control channel (PUCCH). Intervals are typically in a range of 2 ms to 160 ms and depend on how often channel conditions need to be reported in order to be able to decide on the scheduling as described above. If the networks decides that the reported information is too infrequent or too often, it will reconfigure the corresponding UE with a new reporting periodicity. Thus, the PUCCH parameters are configured by the network individually for each UE that is reporting CQI.

When UEs reporting measurements, e.g. CQI, not only report a single type of report but provide different types of reports in the same allocated resources, this could, allow the network to e.g. make a decision for switching from distributed to localized mode downlink transmission or vice versa. For making such a decision, the network however needs measurement information for both modes. There is therefore a need for a method allowing the network to reliably identify which type of content each measurement report contains. Due to resource constraints on the feedback channel, measurement reports are kept as redundancy free as possible so that it is difficult for the network to detect the measurement report types blindly.

SUMMARY OF THE INVENTION

An object of the present invention is to provide a method for configuring a measurement report type to be used by a receiver to report a quality of a channel over which the receiver receives channel resources from a transmitter such that the measurement report type of each measurement report can be reliably identified by the transmitter.

The main idea of the invention is to provide methods for the network side in order to allow UEs to transmit measurement reports of different measurement reporting types where resources for measurement reporting on the feedback channel are assigned to each UE and these resources are distributed between the different measurement reports such that the receiving side in the network exactly knows which measurement report type it receives.

An embodiment of the invention provides a method for configuring a measurement report type to be used by a receiver to report a measurement to a transmitter, wherein the measurement is reported to the transmitter in a report signal over a control channel, said method comprising selecting a first measurement report type and at least one second measurement report type to be used by the receiver to report the measurement, generating a measurement reporting pattern defining an occurrence of the first measurement report type and the at least one second measurement report type in the report signal transmitted by the receiver to the transmitter over the control channel, and notifying the first measurement report type, the at least one second measurement report type, and the generated measurement reporting pattern to the receiver.

Another embodiment of the invention provides a method for configuring a measurement report type to be used by a receiver to report a measurement to a transmitter, wherein the measurement is reported to the transmitter in a report signal over a control channel, said method comprising selecting a first measurement report type and at least one second measurement report type to be used by the receiver to report the measurement, configuring a first measurement reporting process defining an occurrence of the first measurement report type in the report signal, configuring at least one second measurement reporting process defining an occurrence of the at least one second measurement report type in the report signal, and notifying the first measurement report type, the at least one second measurement report type, the configured first measurement reporting process, and the at least one second measurement reporting process to the receiver.

Another embodiment of the invention provides a method for reporting a measurement to a transmitter, wherein the measurement is reported to the transmitter in a report signal over a control channel, said method comprising receiving a notification from the transmitter about a first measurement report type and at least one second measurement report type to be used to report the measurement, and about a measurement reporting pattern defining an occurrence of the first measurement report type and the at least one second measurement report type in the report signal, determining a first measurement information according to the first measurement report type and at least one second measurement information according to the at least one second measurement report type, multiplexing the determined first and the at least one second measurement information according to the notified measurement reporting pattern, thereby obtaining a multiplexed signal, and transmitting the multiplexed signal to the transmitter.

Another embodiment of the invention provides a method for reporting a measurement to a transmitter, wherein the measurement is reported to the transmitter in a report signal over a control channel, said method comprising receiving a notification from the transmitter about a first measurement report type and at least one second measurement report type to be used to report the measurement, and about a first measurement reporting process defining an occurrence of the first measurement report type in the report signal, and at least one second measurement reporting process defining an occurrence of the at least one second measurement report type in the report signal, determining a first measurement information according to the first measurement report type and at least one second measurement information according to the at least one second measurement report type, multiplexing the determined first and the at least one second measurement information according to the notified first measurement reporting process and the at least one second measurement reporting process, respectively, thereby obtaining a multiplexed signal, and transmitting the multiplexed signal to the transmitter.

Another embodiment of the invention provides a transmitter, comprising receiving means for receiving from a receiver over a control channel a report signal on a measurement, selecting means for selecting a first measurement report type and at least one second measurement report type to be used by the receiver to report the measurement, generating means for generating a measurement reporting pattern defining an occurrence of the first measurement report type and the at least one second measurement report type in the report signal transmitted by the receiver to the transmitter over the control channel, and notifying means for notifying the first measurement report type, the at least one second measurement report type, and the generated measurement reporting pattern to the receiver.

Another embodiment of the invention provides a transmitter, comprising receiving means for receiving from a receiver over a control channel a report signal on a measurement, selecting means for selecting a first measurement report type and at least one second measurement report type to be used by the receiver to report the measurement, configuring means for configuring a first measurement reporting process defining an occurrence of the first measurement report type in the report signal, and at least one second measurement reporting process defining an occurrence of the at least one second measurement report type in the report signal, and notifying means for notifying the first measurement report type, the at least one second measurement report type, the configured first measurement reporting process, and the at least one second measurement reporting process to the receiver.

Another embodiment of the invention provides a receiver, comprising transmitting means for transmitting to a transmitter over a control channel a report signal on a measurement, receiving means for receiving a notification from the transmitter about a first measurement report type and at least one second measurement report type to be used to report the measurement, and about a measurement reporting pattern defining an occurrence of the first measurement report type and the at least one second measurement report type in the report signal, determining means for determining a first measurement information according to the first measurement report type and at least one second measurement information according to the at least one second measurement report type, and multiplexing means for multiplexing the determined first and the at least one second measurement information according to the notified measurement reporting pattern, thereby obtaining a multiplexed signal, wherein the receiver is further adapted to transmit the multiplexed signal to the transmitter.

Another embodiment of the invention provides a receiver, comprising transmitting means for transmitting to a transmitter over a control channel a report signal on a measurement, receiving means for receiving a notification from the transmitter about a first measurement report type and at least one second measurement report type to be used to report the measurement, and about a first measurement reporting process defining an occurrence of the first measurement report type in the report signal, and at least one second measurement reporting process defining an occurrence of the at least one second measurement report type in the report signal, determining means for determining a first measurement information according to the first measurement report type and at least one second measurement information according to the at least one second measurement report type, and multiplexing means for multiplexing the determined first and the at least one second measurement information according to the notified first measurement reporting process and the at least one second measurement reporting process, respectively, thereby obtaining a multiplexed signal, wherein the receiver is further adapted to transmit the multiplexed signal to the transmitter.

DETAILED DESCRIPTION OF THE INVENTION

In the following, the invention is described in more detail in reference to the attached figures and drawings. Similar or corresponding details in the figures are marked with the same reference numerals.

The invention describes a method for configuring an uplink measurement report type to be used by a receiver to report a measurement, e.g. a quality of a channel over which the receiver receives channel resources from a transmitter. The measurement is reported by the receiver to the transmitter in a report signal over a control channel. The receiver may send a first measurement report type and at least one second measurement report type, which are sent to the transmitter over the control channel.

According to an embodiment of the invention, in order to enable the receiver to send various measurement report types that are reliably distinguishable in the transmitter on the network side, the network not only configures the reporting interval, as presented in the prior art section, but additionally configures explicitly which measurement report type is to be sent by the receiver at each reporting occurrence.

This can be done by extending the configuration with a measurement reporting pattern that contains mapping information between the measurement reporting occurrences and each measurement report type. In case of n measurement reports, the mapping information indicates for each measurement report the type of each of these reports.

Figure 4:
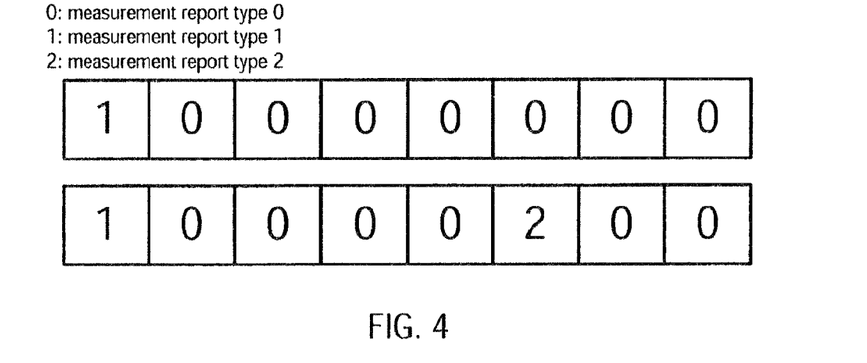
FIG. 4 Examples of a measurement reporting pattern for a) two measurement report types and b) more than two measurement report types.

FIG. 4 illustrates two examples of measurement reporting patterns, depending on the number of different measurement report types that may be sent by the receiver. The first measurement reporting pattern illustrated in FIG. 4 a) configures eight consecutive reporting events to report two different measurement report types. The first measurement report is of type 1, the following seven measurement reports are of type 0. For encoding such a reporting scheme, a binary pattern is sufficient. Hence, FIG. 4 a) represents a bit pattern, which defines the occurrence of two measurement report types in the measurement report signal to be transmitted by the receiver.

However, should there be more than two reporting types to be used, these have to be made distinguishable by using more than one bit for each measurement report type. Hence, FIG. 4 b) represents a measurement reporting pattern using decimal values for measurement report types. In this example, a further measurement report type is defined, which is referred as type 2.

According to an embodiment of the invention, the mapping of reporting events and measurement report types is such that each possible measurement report type is assigned to a unique predetermined measurement report type number. This allows the receiver to know in advance which measurement report type is to be used when receiving the measurement reporting pattern.

Figure 5:
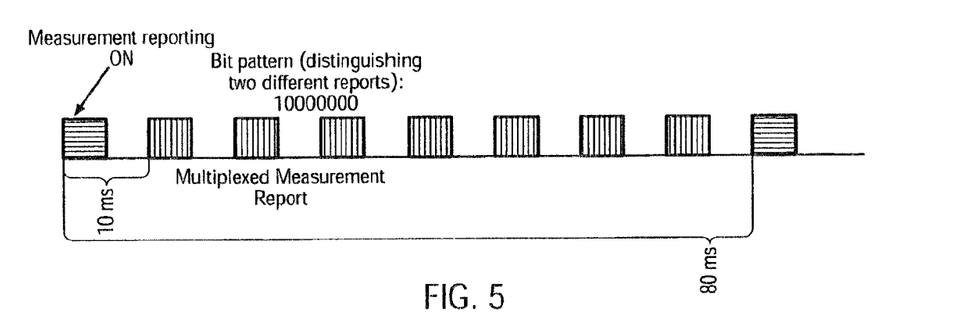
FIG. 5 Multiplexing of measurement reports using a measurement reporting pattern to distinguish between different measurement reports.

A receiver configured with the measurement reporting pattern shown in FIG. 4 a) transmits a measurement report signal as shown in FIG. 5. As in the prior art systems, there exists a single periodicity between two measurement reporting events, where the first measurement report is of type 1, which is represented with horizontal lines, and the following seven measurement reports are of type 0, which is represented with vertical lines. After the eighth measurement report, the pattern will be repeated. This results in a multiplexing of the two measurement report types.

The procedure described above will continue until measurement reporting is stopped (e.g. by explicit control message by either RRC or MAC from the network side) or the receiver, e.g. a UE, gets reconfigured by the transmitter, e.g. the eNodeB of the network, with a new measurement reporting pattern.

Figure 8:
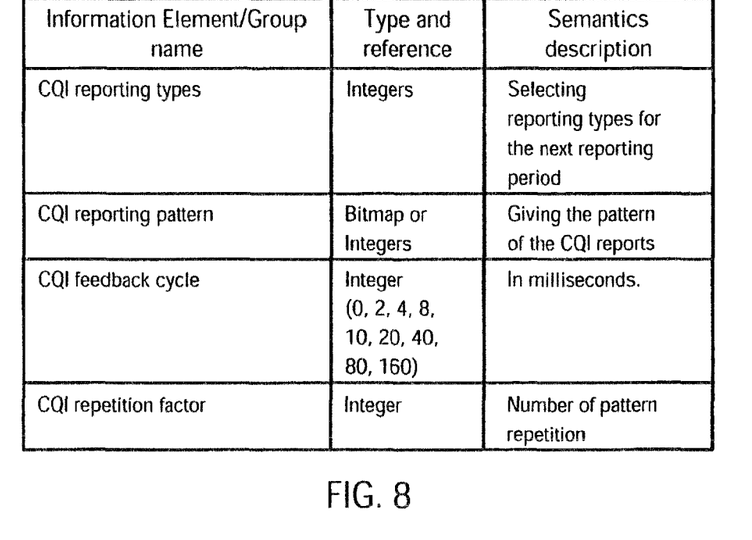
FIG. 8 Information Elements necessary for measurement reporting configuration/reconfiguration message.

All measurement reports of one UE can thus be configured in a single control message that includes the reporting types used, the reporting periodicity, the reporting pattern and optionally the reporting duration, where the latter Information Element (IE) would save a message in order to explicitly stop measurement reporting. The necessary IEs for a Channel Quality Report are exemplarily described in FIG. 8, which shows a table that does not contain all IEs possible for the measurement reporting message, but only those relevant to the invention.

Figure 6:
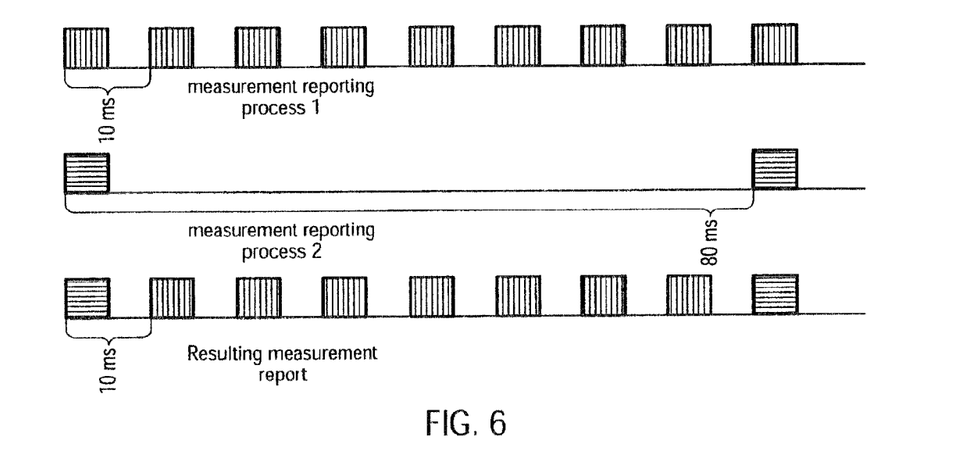
FIG. 6 Multiplexing of measurement reports by configuring different measurement reporting processes.

Another embodiment of the invention, which provides a further improvement of the method according to the invention, will be now be described with respect to FIG. 6. In the previously described embodiment, the introduction of an additional measurement report type or the removal of an existing measurement report type from a UE requires that this specific UE has to be reconfigured with a new measurement reporting pattern. Hence, this requires including the full measurement reporting pattern when reconfiguring the uplink measurement reporting. According to this embodiment of the invention, measurement reporting processes are defined instead of the use of a measurement reporting pattern.

Figure 9:
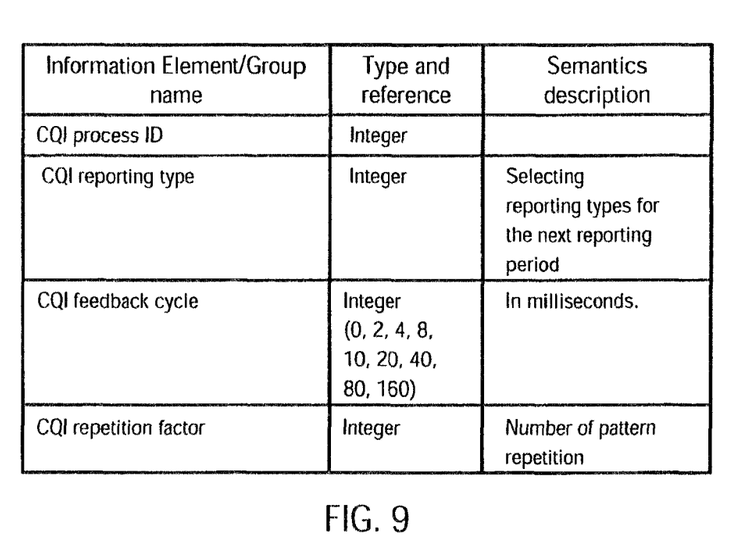
FIG. 9 Information Elements necessary for measurement reporting process message.

A control message from the network configuring a measurement reporting process includes a measurement process ID, a measurement report type, a measurement reporting periodicity and an optional reporting duration. A measurement reporting process message configures only a single measurement reporting process. The IEs for this message are represented for the particular example of channel quality reporting in FIG. 9. The parameter designated therein as CQI feedback cycle represents the measurement reporting periodicity.

The configuration described above results in the same measurement reporting behavior as described with respect to the previously embodiment and illustrated in FIG. 5. The measurement reporting procedure according to this embodiment of the invention is depicted in FIG. 6, where two measurement reporting processes are configured. The first measurement reporting process, which is represented with vertical lines, has a reporting periodicity of 10 ms, whereas the second measurement reporting process, which is represented with horizontal lines, has a reporting periodicity of 80 ms.

Should it be the case that more than one measurement reporting process is scheduled for the same reporting occurrence, the measurement reporting process with the largest reporting periodicity has the highest priority and overrides all the other measurement reporting processes possessing a shorter reporting periodicity. In the example in FIG. 6, the second reporting process thus overrides the first reporting process. This results in the multiplexed measurement reporting scheme which is identical to the one described in FIG. 5.

This embodiment of the invention provides the advantage that for reconfiguration of the reporting for one UE only new or discontinued measurement processes need to be addressed for adding or removing, while existing and continuing measurement processes do not need to be included in the reconfiguration message. In general, this would result in a smaller size of the reconfiguration message when compared to the previously described embodiment.

A further optimization of this embodiment for the case that two or more measurement configuration processes are configured or reconfigured at the same time consists in combining their configuration messages into a single RRC message, thus reducing the amount of messages that need to be sent.

Figure 7:
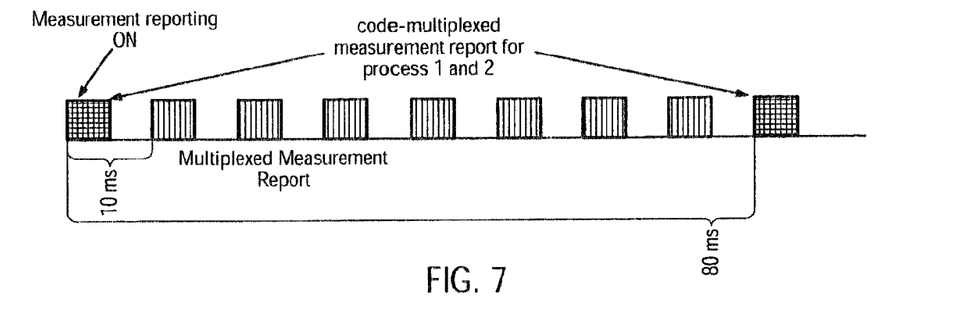
FIG. 7 Code-multiplexing of measurement reports.

Yet another embodiment of the invention, which provides a further improvement of the method according to the invention, will now be described with respect to FIG. 7. In this embodiment, the two measurement reports from the previous embodiment illustrated in FIG. 6, i.e. the first reporting process with a reporting periodicity of 10 ms and the second reporting process with a reporting periodicity of 80 ms, are now multiplexed in the code domain.

Each measurement reporting process is assigned to a specific code, for example a specific cyclic shift of a cyclic code, and each report is encoded with this specific code. Should two or more measurement reports happen at the same reporting occurrence, they are sent simultaneously, thus resulting in a measurement report signal as shown in FIG. 7, where the first and second measurement report are code-multiplexed at the same reporting occurrence.

The configuration of this embodiment is similar to the previously described embodiment with the difference that each measurement reporting process needs to be assigned a unique code. The benefit of this embodiment is that sending more than one measurement reporting process does not affect the time frequency/resources assigned to measurement reporting.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technological Background section. Furthermore the concept of the invention may be also readily used in the LTE RAN currently discussed by the 3GPP.

The invention claimed is:

1. A communication terminal, comprising:
   a transmitting section configured to report a plurality of types of measurement information related to a downlink channel using Orthogonal Frequency-Division Multiplexing (OFDM) over an uplink control channel to a base station, and
   a controlling section configured to set up a first reporting periodicity, over the uplink control channel, of a first measurement information related to the downlink channel and a second reporting periodicity, over the uplink control channel, of a second measurement information related to the downlink channel that is different from the first measurement information;
   wherein the controlling section is further configured to:
   (i) set up the second reporting periodicity of the second measurement information longer than the reporting periodicity of the first measurement information, and
   (ii) drop a report of the first measurement information having the shorter reporting periodicity when the report of the first measurement information and a report of the second measurement information collide with each other.

2. The communication terminal according to claim 1, wherein, when the report of the first measurement information and the report of the second measurement information collide with each other in the same resource; the controlling section drops the report of the first measurement information only in said same resource.

3. The communication terminal according to claim 1, wherein the first measurement information and the second measurement information are measurement information representing different quality information on a per report basis in accordance with a variance of a channel state.

4. The communication terminal according to claim 1, wherein the controlling section sets up such that the second reporting periodicity of the second measurement information is an integer multiple of the first reporting periodicity of the first measurement information.

5. A method for use in a communication terminal, the method comprising the steps of:
   reporting a plurality of types of measurement information related to a downlink channel using Orthogonal Frequency-Division Multiplexing (OFDM) over an uplink control channel to a base station; and
   setting up a first reporting periodicity, over the uplink control channel, of a first measurement information related to the downlink channel and a second reporting periodicity, over the uplink control channel, of a second measurement information related to the downlink channel that is different from the first measurement information, wherein the second reporting periodicity of the second measurement information is set up longer than the first reporting periodicity of the first measurement information, wherein a report of the first measurement information having the shorter reporting periodicity is dropped when the report of the first measurement information and a report of the second measurement information collide with each other.

6. The method according to claim 5, wherein, when the report of the first measurement information and the report of the second measurement information collide with each other in the same resource, the report of the first measurement information is dropped only in said same resource.

7. The method according to claim 6 wherein the first measurement information and the second measurement information are measurement information representing different quality information on a per report basis in accordance with a variance of a channel state.

8. The method according to claim 5, the method comprising the step of:

setting up such that the second reporting periodicity of the second measurement information is an integer multiple of the first reporting periodicity of the first measurement information.

* * * * *